United States Patent
Fuchs et al.

(10) Patent No.: US 11,223,258 B2
(45) Date of Patent: Jan. 11, 2022

(54) ELECTRIC MOTOR AND METHOD FOR PRODUCING SUCH AN ELECTRIC MOTOR

(71) Applicant: Volkswagen Aktiengesellschaft, Wolfsburg (DE)

(72) Inventors: Martin Fuchs, Baunatal (DE); Peter Bahrmann, Niedenstein (DE); Nils Wilhelm, Edertal (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 227 days.

(21) Appl. No.: 16/491,764

(22) PCT Filed: Feb. 22, 2018

(86) PCT No.: PCT/EP2018/054405
§ 371 (c)(1),
(2) Date: Sep. 6, 2019

(87) PCT Pub. No.: WO2018/162247
PCT Pub. Date: Sep. 13, 2018

(65) Prior Publication Data
US 2020/0373818 A1    Nov. 26, 2020

(30) Foreign Application Priority Data
Mar. 8, 2017  (DE) ............ 10 2017 203 788.1

(51) Int. Cl.
*H02K 11/25* (2016.01)
*H02K 3/50* (2006.01)
*H02K 15/00* (2006.01)

(52) U.S. Cl.
CPC ............ *H02K 11/25* (2016.01); *H02K 3/50* (2013.01); *H02K 15/0025* (2013.01)

(58) Field of Classification Search
CPC .......... H02K 5/225; H02K 5/20; H02K 11/25; H02K 1/145; H02K 3/24; H02K 3/38;
(Continued)

(56) References Cited

U.S. PATENT DOCUMENTS

| 4,571,518 A * | 2/1986 | Kintz, Jr. | ............... H02K 11/25 |
| | | | 310/68 C |
| 9,673,687 B2 * | 6/2017 | Takamizawa | .......... H02K 11/25 |

FOREIGN PATENT DOCUMENTS

| DE | 102012011004 A1 | 12/2013 | ............ H02K 11/00 |
| DE | 102013201834 A1 | 8/2014 | ............ H02K 11/00 |

(Continued)

OTHER PUBLICATIONS

International Search Report and Written Opinion, Application No. PCT/EP2018/054405, 14 pages, dated May 7, 2018.

*Primary Examiner* — Tran N Nguyen
*Assistant Examiner* — Leda T Pham
(74) *Attorney, Agent, or Firm* — Slayden Grubert Beard PLLC

(57) ABSTRACT

The invention relates to an electric motor comprising a rotor and a stator, the hollow cylindrical stator of which has a distributed winding consisting of multiple circumferential coil layers arranged one over the other in layers with a winding head. A temperature sensor for detecting a winding head temperature is arranged in the winding head. A dimensionally stable sensor receiving element with a functional section having a receiving area for the temperature sensor is provided which is added between two adjacent coil layers arranged one over the other such that the functional section is fixed in the winding head between the two coil layers that are spread apart by the introduction of the functional section and that the temperature sensor can be inserted into and removed from the receiving area through an opening arranged in a base section of the sensor receiving element, (Continued)

wherein the receiving area is delimited on one hand sectionally by the functional section and on the other hand sectionally by the winding. In addition, the invention relates to a method for producing an electric motor comprising a stator and a rotor.

20 Claims, 7 Drawing Sheets

(58) Field of Classification Search
CPC ............ H02K 3/50; H02K 3/505; H02K 3/46; H02K 3/525; H02K 9/19; H02K 9/16; H02K 15/12; H02P 27/06; B60L 2240/425; B60Y 2306/05; B60Y 2400/604

See application file for complete search history.

(56) References Cited

FOREIGN PATENT DOCUMENTS

| | | | |
|---|---|---|---|
| DE | 102013201835 A1 | 8/2014 | ............. H02K 11/00 |
| DE | 102015203435 A1 | 9/2016 | ............. G01K 1/16 |
| DE | 102016103307 A1 | 9/2016 | ............. H02K 11/25 |
| DE | 102017203788 A1 | 9/2018 | ............. H02K 11/25 |
| GB | 767383 A | 1/1957 | ............. H01K 11/00 |
| JP | 2003092858 A | 3/2003 | ............. H02K 11/00 |
| JP | 2011254628 A | 12/2011 | ............. G01K 1/14 |
| WO | 2018/162247 A1 | 9/2018 | ............. H02K 11/25 |

* cited by examiner

ELECTRIC MOTOR AND METHOD FOR PRODUCING SUCH AN ELECTRIC MOTOR

CROSS-REFERENCE TO RELATED APPLICATIONS

This application claims priority to German Patent Application No. DE 10 2017 203 788.1, filed on Mar. 8, 2017 with the German Patent and Trademark Office. The contents of the aforesaid Patent Application are incorporated herein for all purposes.

TECHNICAL FIELD

The invention relates to an electric motor comprising a rotor and a stator, the hollow cylindrical stator of which has a distributed coil consisting of multiple circumferential coil layers arranged one over the other in layers with a winding head and a temperature sensor for detecting a winding head temperature. In addition, the invention relates to a method for producing an electric motor comprising a stator and a rotor in which a temperature sensor for detecting the winding head temperature is arranged in a winding head of a distributed coil of the hollow cylindrical stator consisting of multiple circumferential coil layers arranged one over the other in layers.

BACKGROUND

It is generally known that electric motors must be protected from overheating, in particular to prevent damage to the coils and/or a negative impairment of the magnets. This is generally achieved by directly or indirectly monitoring the temperature of an electric motor at one or more locations and taking steps above a certain temperature to counteract a further temperature increase. In most cases, this is done by a control system or regulation system with the assistance of the power electronics.

To increase the power of e-machines, the coils are built closer and closer together, which results in less and less installation space for arranging a temperature sensor for detecting the temperature. When using round coils, the installation space for the temperature sensor results from the constructively determined available distance between the windings or respectively between two adjacent round coils. However, recently electric motors with distributed windings, also known as wave windings, have become increasingly prevalent. In this case, the winding consists of multiple circumferential annular coil layers arranged one over the other in layers, wherein the highest temperatures often prevail in the winding head of the winding. Due to the design, however, the winding head of a wave winding is very stiff depending on the geometry of the copper wires. As a result, the temperature sensor cannot easily be placed between the coil layers of the winding. When placing the temperature sensor, there is a danger of destroying or damaging the temperature sensor and/or the coil layers.

Until now, the temperature measurement on such winding heads was therefore performed by a temperature sensor arranged radially or axially on the winding head so that it only abuts the winding head surface at points. As a result, the temperature measurement delivers values that are lower than the temperatures that actually prevail inside the winding head. In addition, a large temporal delay in the measured temperature changes can be observed. However, the most exact possible knowledge is a requirement in order to provide the maximum performance of the e-machine.

DE 10 2013 201 835 A1 describes an arrangement for detecting the temperature of a winding of a stator of an electrical machine. In this case, the stator winding consists of multiple individual coils arranged on stator teeth, wherein a gap is formed between each of the adjacent individual coils. A temperature sensor provided for detecting the temperature of the winding is arranged in one of these gaps. The winding is not a wave winding described in the preceding consisting of multiple circumferential coil layers arranged one over the other.

An electric motor with a temperature sensor for detecting a temperature of a winding arranged around a stator core is known from DE 10 2016 103 307 A1. In this case, a temperature sensor inserted in a fastening device is inserted into a slot between the stator core and the windings and fixed to the winding by a projection that engages with an edge of the opening of the winding. The winding is also not a wave winding described in the preceding consisting of multiple circumferential coil layers arranged one over the other.

SUMMARY

An object exists to implement an electric motor such that the temperature measurement in a distributed winding of a stator, such as for example formed as a wave winding, is substantially improved, and in particular that undesired errors during the temperature measurement are avoided. Another object exists to provide a particularly simple production process for such an electric motor.

The first object may be solved by an electric motor according to the features of the independent apparatus claim. The second object may be solved by a method according to the features of the independent method claim. The dependent claims relate to embodiments of the invention.

The details of one or more embodiments are set forth in the accompanying drawings and the description below. Other features will be apparent from the description, drawings, and from the claims.

DETAILED DESCRIPTION

Figure 1:
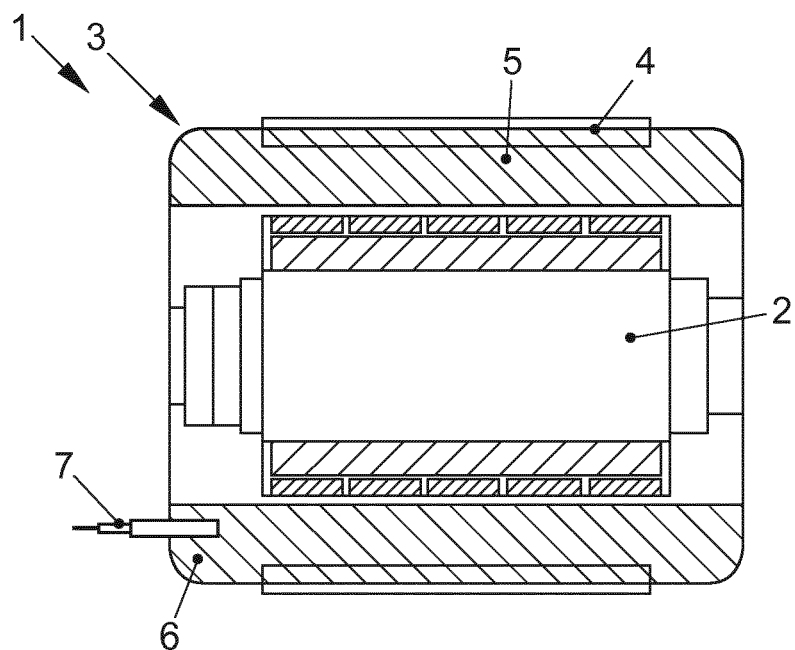
FIG. 1 shows a principle sketch of an electric motor with a temperature sensor added to a winding head of a winding.

According to one aspect, an electric motor is provided in which a dimensionally stable sensor receiving element with a functional section having at least one receiving area for the temperature sensor is added between two adjacent coil layers arranged one over the other such that the functional section is fixed in the winding head between the two coil layers that are spread apart by the introduction of the functional section and that the temperature sensor can be inserted into and removed from the receiving area through an opening arranged in a base section of the sensor receiving element, wherein the receiving area is delimited on one hand sectionally by the functional section and on the other hand sectionally by the winding. The temperature sensor arranged in the receiving area of the sensor receiving element directly abuts the coil layers or respectively the winding at least sectionally due to the design, so that a good heat transfer with low heat loss is ensured between the heat source, namely the electrically conductive wires of the coil layers, and the temperature sensor. This ensures an optimal thermal connection of the temperature sensor arranged in the winding head of a wave winding and allows undesired errors and measurement value deviations to be reliably avoided. By arranging the sensor receiving element between two adjacent coil layers, the temperature sensor extends in the axial direction into the interior of the winding head so that not only a surface temperature, as in the state of the art, but an internal or core temperature of the winding head is detected and the electric motor can be operated with maximum performance as a result. In addition, the use of the sensor receiving element according to the present aspect ensures that the temperature sensor is replaceable so that a defective temperature sensor can be easily removed from the winding or respectively the sensor receiving element and replaced with a functional temperature sensor. The arrangement of the temperature sensor in the receiving area occurs only after the sensor receiving element has already been introduced between the two coil layers, so that damage to the temperature sensor during introduction into the winding head is prevented. In addition, the geometric design of the sensor receiving element, which will be described in more detail in the following, minimizes the danger of damaging the wires of the coil layers when inserting the sensor receiving element between the two coil layers.

Of course, the sensor receiving element could also in some embodiments be designed to receive more than one temperature sensor. In this case, the functional section then has multiple receiving areas arranged next to each other and the base section has multiple openings arranged next to each other for the respective temperature sensors.

The at least sectional delimitation of the receiving area by the winding is achieved in some embodiments in that the functional section of the sensor receiving element has at least one through hole, wherein the receiving area for the temperature sensor is delimited in the region of the through hole by at least one of the two coil layers of the winding. As a result, the temperature sensor arranged in the receiving area of the sensor receiving element is in direct contact in the region of the through hole with the winding or respectively with one of the two coil layers between which the functional section is arranged.

In some embodiments of such a design, it is provided, however, that the functional section of the sensor receiving element has two through holes that are arranged diametrically opposite to each other, wherein the receiving area in the region of the two through holes is delimited by each of the two coil layers. This ensures that the temperature sensor arranged in the receiving area contacts both coil layers that receive the functional section between them.

In some embodiments of the sensor receiving element, the functional section has two legs that are arranged diametrically, extend axially and sectionally delimit the receiving area, which are connected in an end region that faces away from the base section by a cross member, wherein the receiving area is delimited by one of the two coil layers in the region of the two through holes that extend between the legs. The cross member provides the necessary torsional stiffness or respectively dimensional stability of the functional section or respectively of the sensor receiving element. The dimensional stability ensures that the functional section can shape and expand the two coil layers during insertion corresponding to its outer contour. When inserting the functional section, the cross member first contacts the two coil layers, spreads them apart and thus creates the space that is required for the arrangement of the functional section between the coil layers.

In some embodiments, the at least one through hole or the two through holes that are arranged diametrically opposite each other, as mentioned in the preceding, is/are slot- or respectively slit-shaped and extend in the axial direction, in particular parallel to the inserted temperature sensor or respectively to the axially extending legs.

The danger of damaging the coil layers when inserting the functional section between the two coil layers may also be minimized when the outer surfaces of the two legs that face away from the receiving area are convex and/or that one outer surface of the cross member connecting the two legs that faces away from the receiving area is convex. In the region of the outer surfaces of the legs and the cross member that contact the coil layers, there are then no sharp edges or corners which could become hooked on the wires of the coil layers and therefore damage or destroy them. In addition, the insertion is also made easier since the coil layers slide along the outer surfaces.

In some embodiments, the outer surface of each leg that faces away from the receiving area is formed by two guide surfaces that run radially towards each other, wherein one of the two coil layers at least sectionally abuts each of the two guide surfaces. When inserting the functional section between the two coil layers, these are bent or spread apart such that, due to the stiffness of the coil layers, a recess that tapers to a point is formed between the two coil layers, wherein the legs are adapted to the shape of the gap by the guide surfaces that taper to a point. The coil layers abut the guide surfaces and generate clamping forces directed at them which fix the sensor receiving element in the winding head.

In some embodiments of the sensor receiving element, the inner surfaces of the two legs that face the receiving area are concave. The inner surfaces form a guide and a contact surface for the temperature sensor that is insertable or respectively inserted into the receiving area, an insertable placeholder and an insertable auxiliary insertion element. The placeholder may be inserted into the receiving area prior to an impregnation of the winding head to seal the opening and prevent penetration of impregnation material. The auxiliary insertion element may be arranged temporarily in the opening or respectively the receiving area for the insertion of the sensor receiving element between the two coil layers.

Inserting the temperature sensor into the opening or respectively the receiving area of the sensor receiving element is made easier in some embodiments in that the base section of the sensor receiving element has an insertion funnel which circumferentially encloses the opening for inserting and removing the temperature sensor. In addition, the circumferentially closed insertion funnel serves to ensure the necessary dimensional stability or respectively torsional stiffness of the functional section or respectively of the sensor receiving element.

In some embodiments, an outer surface of the base section tapers conically in the direction of the functional section and at least sectionally abuts the end sections of the two coil layers. The outer surface therefore forms a stop or respectively a depth limitation during insertion of the sensor receiving element between the two coil layers so that it is ensured that the sensor receiving element is not pushed too deeply into the winding head.

The outer surface of the base section may also have a contour or geometry that deviates from this, e.g., to form a corresponding engagement surface for the tool for inserting the sensor receiving element between the two coil layers.

According to another aspect, a method for producing an electric motor having a rotor and a stator is provided in which, after introducing the coil layers into the stator and before introducing the temperature sensor into the winding head, a dimensionally stable sensor receiving element provided for receiving the temperature sensor and having an opening for inserting and removing the temperature sensor is added between two adjacent coil layers arranged one over the other by means of an auxiliary insertion means engaging with the opening, such that the two coil layers are spread apart and form a clamping force that fixes the sensor receiving element, wherein the sensor receiving element abuts an axial stop during the insertion process, and that the temperature sensor is inserted into the opening of the sensor receiving element after the auxiliary insertion element has been removed from the opening. For an impregnation process of the winding head following the removal of the auxiliary insertion element from the opening, a correspondingly formed placeholder which prevents the impregnation material from penetrating into the receiving area through the opening in the base section and through the through holes in the functional section is placed into the opening. At the same time, the placeholder also serves to form the receiving area in the region of the through holes in the functional section.

Many further embodiments are possible. Additional features and embodiments of the present invention can be found in the following description and the claims in conjunction with the FIGS.

FIG. 1 shows a principle sketch of an electric motor 1 according to an embodiment designed as a drive motor with a rotor 2 and a stator 3. The stator 3 comprises a hollow cylindrical stator lamination 4 designed as a laminated core and a distributed winding 5 with a winding head 6 protruding from the stator lamination 4 in the axial direction which is impregnated with an impregnation material, such as for example a resin. A temperature sensor 7 for detecting a winding head temperature is arranged in the winding head 6.

Figure 2:
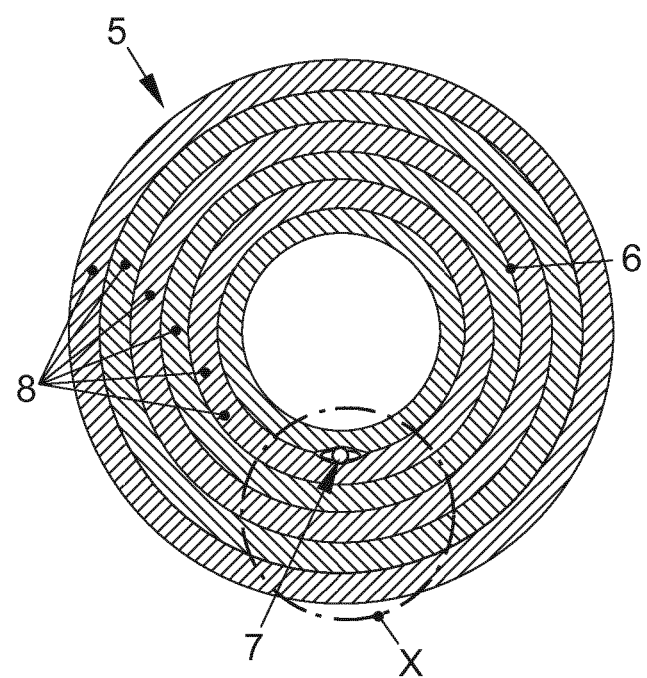
FIG. 2 shows the winding head of the electric motor shown in FIG. 1 with the added temperature sensor in a side view.

As can be seen in FIG. 2, the winding 5 and the winding head 6 are designed as a wave winding and have multiple circumferential annular coil layers 8 arranged one over the other in layers. In the embodiment shown, a total of six coil layers 8 form the winding 5 or respectively the winding head 6. The coil layers 8 in turn consist of wound wires, such as for example made of copper, and form a copper mat. The temperature sensor 7 is embedded in the winding head 6 and arranged between two adjacent coil layers 8 that are arranged one over the other.

Figure 3:
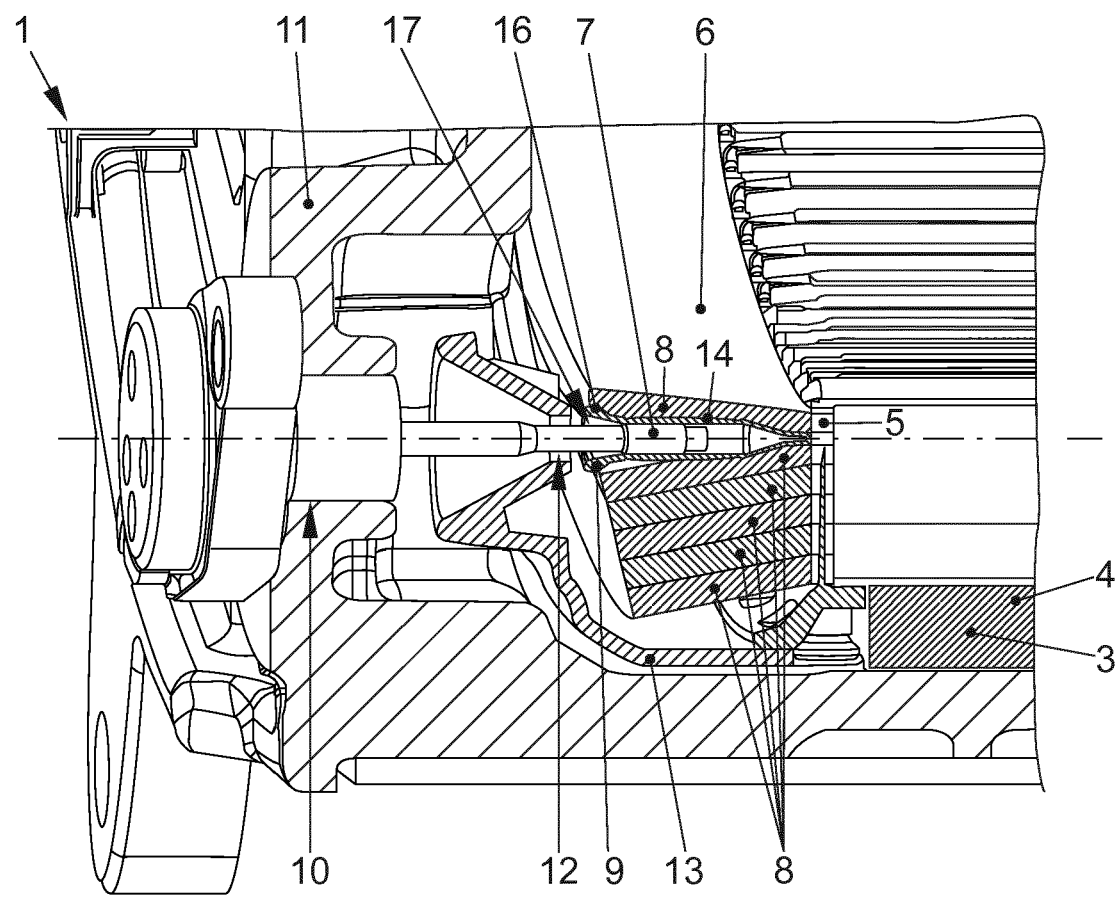
FIG. 3 shows an enlarged sectional representation of the temperature sensor added between two coil layers of the winding.

An enlarged representation of the temperature sensor 7 arranged between two coil layers 8 of the winding head 6 is depicted in FIG. 3. A dimensionally stable sensor receiving element 9 that receives the temperature sensor 7 and extends axially is arranged and fixed between the radially inner coil layer 8 and the adjacent coil layer 8 that encloses it. The temperature sensor 7 reaches through a through hole 10 in a housing component 11 of the electric motor 1 as well as a through hole 12 in a insulating disk 13 and is arranged on the sensor receiving element 9 that is fixed between the two coil layers 8.

Figure 4:
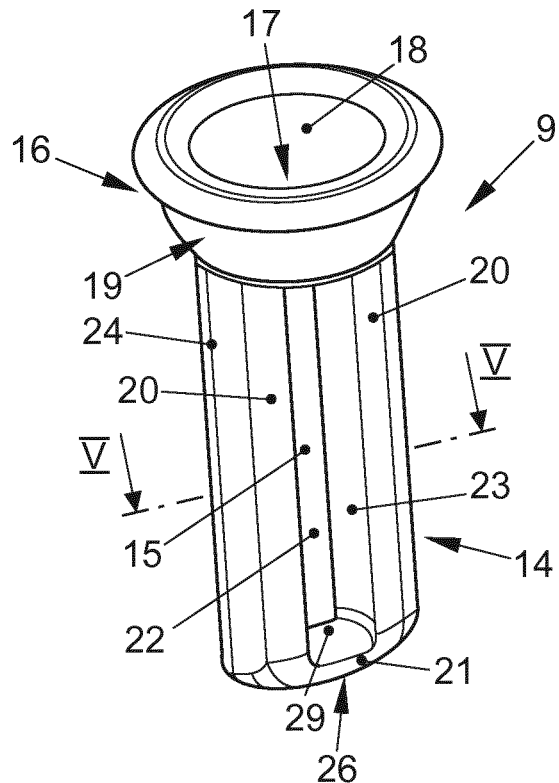
FIG. 4 shows a sensor receiving element provided for receiving the temperature sensor in a perspective view.
Figure 5:
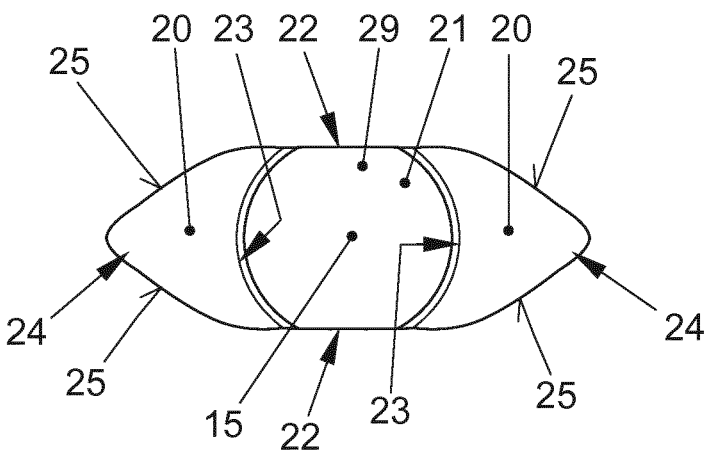
FIG. 5 shows the sensor receiving element shown in FIG. 4 in a sectional view according to line V-V.

The dimensionally stable sensor receiving element 9 will be described briefly in the following with reference to FIGS. 4 and 5.

The sensor receiving element 9 has a functional section 14 extending axially with a receiving area 15 for the temperature sensor 7 and a base section 16 with an opening 17 through which the temperature sensor 7 can be placed into and removed from the receiving area 15. Beneficially, the sensor receiving element 9 comprising the base section 16 and the functional section 14 is designed as a single part and consists of a suitable plastic material.

The base section 16 of the sensor receiving element 9 has an insertion funnel 18 which circumferentially encloses the opening 17 for inserting and removing the temperature sensor 7. An outer surface 19 of the base section 16 is conical and tapers in the direction of the functional section 14.

The functional section 14 of the sensor receiving element 9 consists of two legs 20 arranged diametrically, extending axially and sectionally delimiting the receiving area 15, which legs are connected in an end region that faces away from the base section 16 by a cross member 21. Next to the two legs 20, the functional section 14 has two through holes 22 lying diametrically opposite each other. The slot-shaped through holes 22 extend between the legs 20 in the axial direction, for example on the entire length between the cross member 21 and the base section 16.

The inner surfaces 23 of the two legs 20 that face toward the receiving area 15 are each concave. The outer surfaces 24 of the two legs 20 that face away from the receiving area 15 are convex and each consist of two guide surfaces 25 that run radially towards each other. The outer surface 26 of the cross member 21 that connects the two legs 20 is also convex.

The sensor receiving element 9 comprising the base section 16 and the functional section 14 consists of plastic material and is designed as a single piece.

Figure 6:
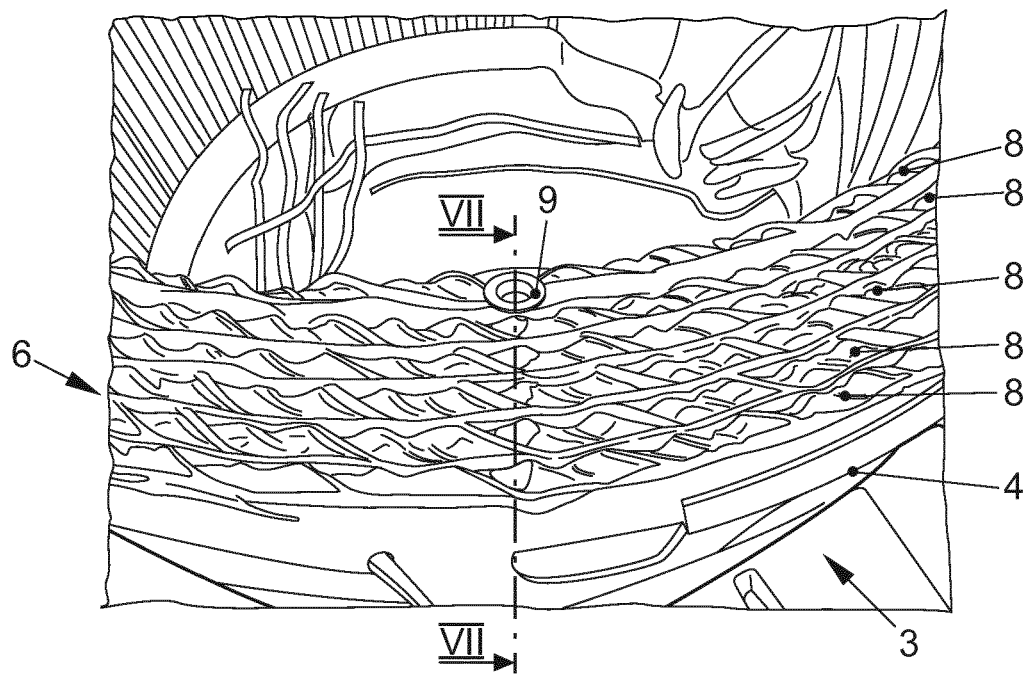
FIG. 6 shows a perspective view of the winding head with the sensor receiving element added between two coil layers.
Figure 7:
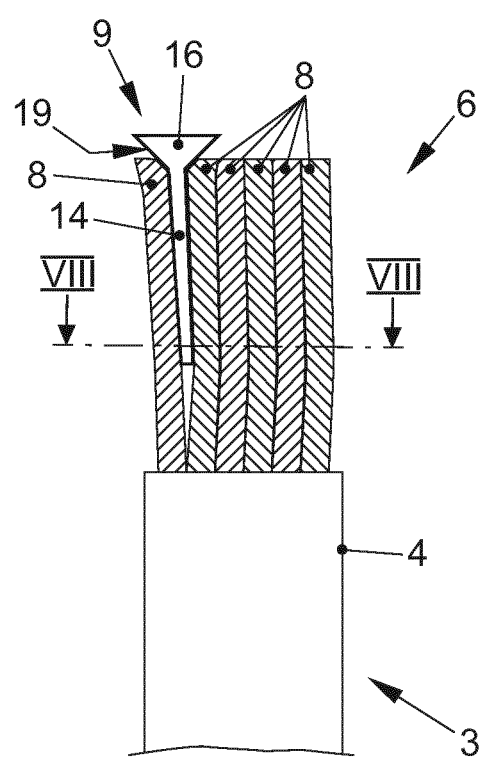
FIG. 7 shows the sensor receiving element arranged between two coil layers in a sectional view according to line VII-VII in FIG. 6.
Figure 8:
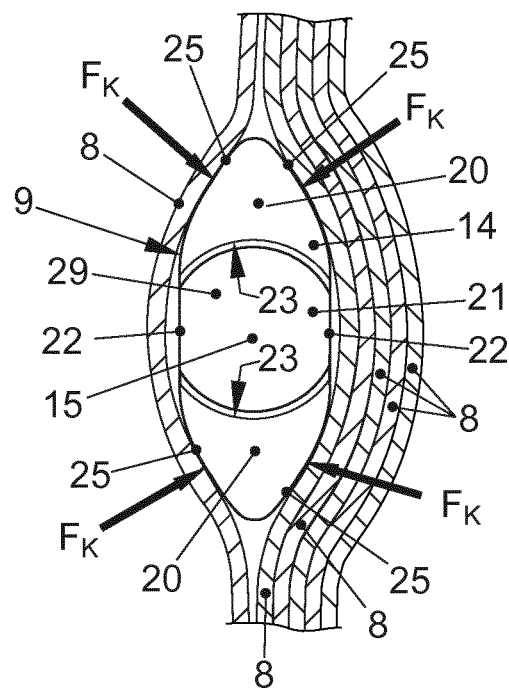
FIG. 8 shows the sensor receiving element arranged between two coil layers in a sectional view according to line VIII-VIII in FIG. 7.

FIGS. 6 to 8 show the sensor receiving element 9 that is added between the radially inner coil layer 8 and the adjacent coil layer 8 in different views. The sensor receiving element 9 has been added or respectively inserted between the adjacent coil layers 8 arranged one over the other in the stator 3 or respectively stator lamination 4 such that the functional section 14 with the receiving area 15 for the temperature sensor 7 is fixed in the winding head 6 of the winding 5 between the two coil layers 8 that are spread apart by the introduction or respectively insertion of the functional section 14. The base section 16 is arranged in the winding head 6 such that the temperature sensor 7 can be inserted into as well as removed from the receiving area 15 of the functional section 14 through the opening 17 in the base section 16.

As is clearly discernible in FIG. 8, the receiving area 15 for the temperature sensor 7 is delimited on one hand by the two inner surfaces 23 of the legs 20 and on the other hand in the region of the two through holes 22 by the two coil layers 8 of the winding 5. The coil layers 8 abut the functional section 14 of the sensor receiving element 9 in the region of the outer guide surfaces 25 of the legs 20. The two coil layers 8 generate a clamping force $F_K$ resulting from the spreading apart of the coil layers 8 and acting upon the guide surfaces 25 of the legs 20, by which the sensor receiving element 9 is fixed in the winding head 6 between the two coil layers 8.

Figure 9:
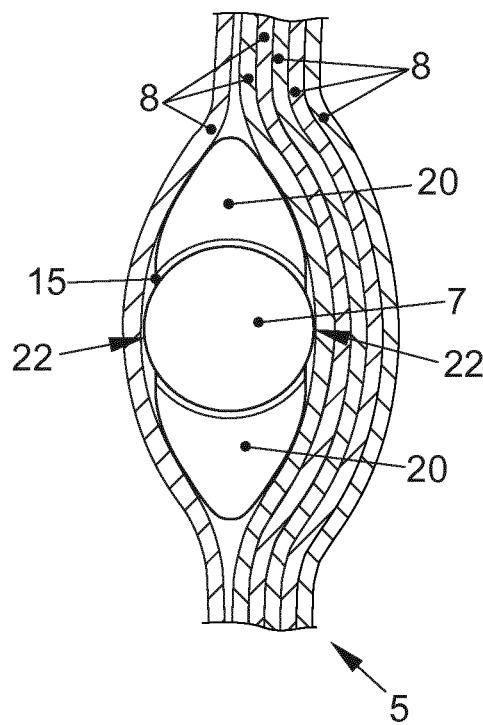
FIG. 9 shows a representation according to FIG. 8 with a temperature sensor arranged in the receiving area.

FIG. 9 shows the representation according to FIG. 8 with a receiving area 15 that is delimited by the legs 20 and by the coil layers 8 and in which the temperature sensor 7 is arranged. In the region of the through holes 22 of the sensor receiving element 9, the temperature sensor 7 is in direct contact with the coil layers 8 so that a good heat transfer between the coil layers 8 of the winding 5 and the temperature sensor 7 is ensured.

Figure 10:
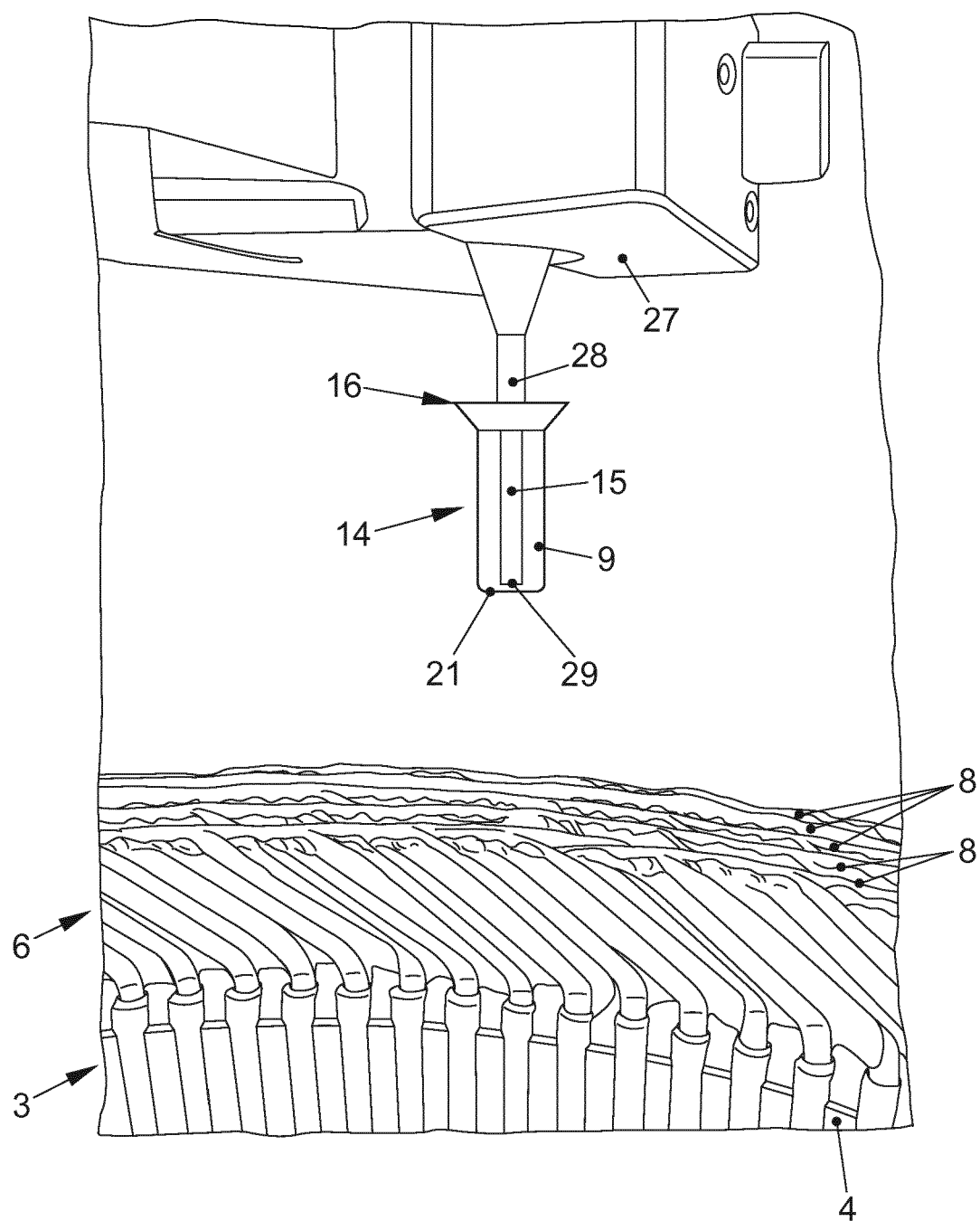
FIG. 10 shows a perspective view of an auxiliary insertion element inserted into the receiving area of the sensor receiving element before being added into the winding head.

In the following, the method for producing the electric motor 1 or respectively the method for introducing the sensor receiving element 9 into the winding head 6 of the winding 5 will be explained briefly with reference to FIGS. 10 and 11.

After introducing the total of six coil layers 8 into the stator lamination 4 of the stator 3, the sensor receiving element 9 described in the preceding is introduced between the radially inner coil layer 8 and the adjacent coil layer 8 by means of an auxiliary insertion element 28 that is designed, for example, as a spike and connected to a press 27. To do this, the sensor receiving element 9 is arranged on the auxiliary insertion element 28 as shown in FIG. 10 such that it engages through the opening 17 in the base section 16 into the receiving area 15 of the functional section 14. In the exemplary embodiment shown, a tip of the auxiliary insertion element 28 forms an axial stop for the sensor receiving element 9, wherein the tip of the auxiliary insertion element 28 abuts an inner surface 29 of the cross member 21. This axial stop can, however, also be formed by an, e.g., circumferential projection (not shown) that is arranged on the auxiliary insertion element 28 and abuts the sensor receiving element 9, e.g., the base section 16. It is also conceivable to use a conical spike which forms the stop together with the wall surface of the sensor receiving element 9 delimiting the opening 17.

Figure 11:
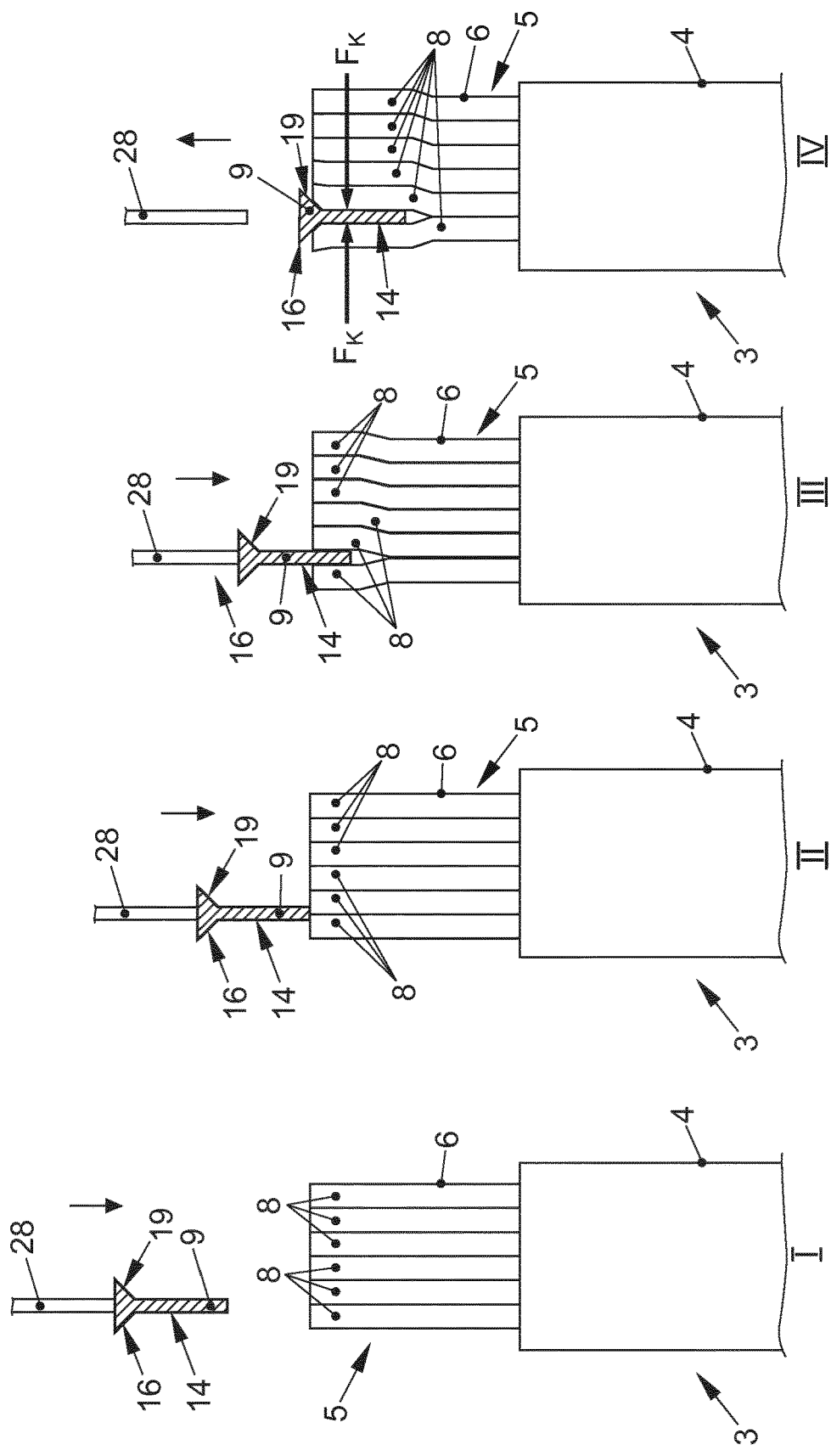
FIG. 11 shows consecutive method steps for adding the sensor receiving element between two coil layers of the winding.

FIG. 11 shows the progression of the method for introducing the sensor receiving element 9 into the winding head 6 of the winding 5, wherein temporally sequential method steps are depicted from left to right. First, the sensor receiving element 9 is arranged on the auxiliary insertion element 28 (method step I) and displaced relative to the winding head 6 by an advance movement of the auxiliary insertion element 28 shown by means of a directional arrow (method step II). Then, the two adjacent coil layers 8 are spread or respectively bent apart by a further advance movement of the auxiliary insertion element 27 (method step III). The advance movement ends when the functional section 14 of the sensor receiving element 9 is arranged between the two coil layers 8 or respectively when an outer surface 19 of the base section 16 abuts the end sections of the two coil layers 8 (method step IV). After completion of the depicted method steps, the sensor receiving element 9 is fixed in the winding head 6 of the winding 5 by a clamping force $F_K$ generated by the two coil layers 8. For a subsequent impregnation process of the winding head, a placeholder which seals the opening 17 in the base section 16 is then placed into the receiving area 15 of the sensor receiving element 9. In addition to the opening 17 in the base section, the placeholder also seals the through holes 22 in the functional section 14 and in this way serves to form the receiving area 15 in the region of the through holes 22. After the impregnation process, the placeholder can then be removed and the temperature sensor 7 inserted through the opening 17 into the receiving area 15. In doing so, the temperature sensor 7 reaches through the opening 10 in the housing component 11 and the opening 12 in the insulating disk 13 and is fixed to the electric motor 1, for example to the housing component 11.

REFERENCE NUMBER LIST

1 Electric motor
2 Rotor
3 Stator
4 Stator lamination
5 Winding
6 Winding head
7 Temperature sensor
8 Coil layer
9 Sensor receiving element
10 Through hole
11 Housing component
12 Through hole
13 Insulating disk
14 Functional section
15 Receiving area
16 Base section
17 Opening
18 Insertion funnel
19 Outer surface
20 Leg
21 Cross member
22 Through hole
23 Inner surface
24 Outer surface
25 Guide surface
26 Outer surface
27 Press
28 Auxiliary insertion element
29 Inner surface
$F_K$ Clamping force The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the words "comprising" and "including" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. An electric motor comprising a rotor and a stator, wherein the stator has a distributed winding consisting of multiple circumferential coil layers arranged one over the other in layers with a winding head and a temperature sensor for detecting a winding head temperature, wherein a dimensionally stable sensor receiving element with a functional section having a receiving area for the temperature sensor is added between two adjacent coil layers arranged one over the other such that the functional section is fixed in the winding head between the two coil layers that are spread apart by an introduction of the functional section and that the temperature sensor can be inserted into and removed from the receiving area through an opening arranged in a base section of the sensor receiving element, wherein the receiving area is delimited on one hand sectionally by the functional section and on the other hand sectionally by the winding.

2. The electric motor according to claim 1,
wherein the functional section of the sensor receiving element has at least one through hole,
wherein the receiving area for the temperature sensor is delimited in the region of the through hole by at least one of the two coil layers of the winding.

3. The electric motor according to claim 2,
wherein the functional section of the sensor receiving element has two through holes arranged diametrically opposite each other,
wherein the receiving area for the temperature sensor is delimited in the region of the two through holes by one of the two coil layers of the winding.

4. The electric motor according to claim 2,
wherein the functional section has two legs that are arranged diametrically, extend axially and sectionally delimit the receiving area, wherein the two legs are connected in an end region that faces away from the base section by a cross member,
wherein the receiving area is delimited in the region of the two through holes extending between the legs by one of the two coil layers of the winding.

5. The electric motor according to claim 2, wherein the inner surfaces of the two legs that face toward the receiving area are concave.

6. The electric motor according to claim 2, wherein the outer surfaces of the two legs that face away from the receiving area are convex and/or that an outer surface of the cross member connecting the two legs that faces away from the receiving area is convex.

7. The electric motor according to claim 1,
wherein the functional section of the sensor receiving element has two through holes arranged diametrically opposite each other,
wherein the receiving area for the temperature sensor is delimited in the region of the two through holes by one of the two coil layers of the winding.

8. The electric motor according to claim 7,
wherein the functional section has two legs that are arranged diametrically, extend axially and sectionally delimit the receiving area, wherein the two legs are connected in an end region that faces away from the base section by a cross member,
wherein the receiving area is delimited in the region of the two through holes extending between the legs by one of the two coil layers of the winding.

9. The electric motor according to claim 7, wherein the inner surfaces of the two legs that face toward the receiving area are concave.

10. The electric motor according to claim 7, wherein the outer surfaces of the two legs that face away from the receiving area are convex and/or that an outer surface of the cross member connecting the two legs that faces away from the receiving area is convex.

11. The electric motor according to claim 1,
wherein the functional section has two legs that are arranged diametrically, extend axially and sectionally delimit the receiving area, wherein the two legs are connected in an end region that faces away from the base section by a cross member,
wherein the receiving area is delimited in the region of the two through holes extending between the legs by one of the two coil layers of the winding.

12. The electric motor according to claim 11, wherein the inner surfaces of the two legs that face toward the receiving area are concave.

13. The electric motor according to claim 11, wherein the outer surfaces of the two legs that face away from the receiving area are convex and/or that an outer surface of the cross member connecting the two legs that faces away from the receiving area is convex.

14. The electric motor according to claim 1, wherein the inner surfaces of the two legs that face toward the receiving area are concave.

15. The electric motor according to claim 14, wherein the outer surfaces of the two legs that face away from the receiving area are convex and/or that an outer surface of the cross member connecting the two legs that faces away from the receiving area is convex.

16. The electric motor according to claim 1, wherein the outer surfaces of the two legs that face away from the receiving area are convex and/or that an outer surface of the cross member connecting the two legs that faces away from the receiving area is convex.

17. The electric motor according to claim 1,
wherein the outer surface of each leg that faces away from the receiving area is formed by two guide surfaces that run radially towards each other,
wherein one of the two coil layers at least sectionally abuts each of the two guide surfaces of each leg.

18. The electric motor according to claim 1, wherein the base section of the sensor receiving element has an insertion funnel that circumferentially encloses the opening for inserting and removing the temperature sensor.

19. The electric motor according to claim 1, wherein an outer surface of the base section tapers conically in the direction of the functional section and at least sectionally abuts the end sections of the two coil layers that receive the functional section between them.

20. A method for producing an electric motor comprising a stator and a rotor according to claim 1, wherein a temperature sensor for detecting the winding head temperature is arranged in a winding head of a distributed winding of the stator consisting of multiple circumferential coil layers arranged one over the other in layers,
wherein after introducing the coil layers into the stator and before introducing the temperature sensor into the winding head, a dimensionally stable sensor receiving element provided for receiving the temperature sensor and having an opening for inserting and removing the temperature sensor is added between two adjacent coil layers arranged one over the other by means of an auxiliary insertion element engaging in the opening, such that the two coil layers are spread apart and form a clamping force that fixes the sensor receiving element,
wherein the temperature sensor is placed through the opening into the receiving area of the sensor receiving element after the auxiliary insertion element has been removed from the opening.

* * * * *